Sept. 18, 1956     W. D. TIMMONS     2,763,143
DUST PAN OR CRUMB TRAY
Filed April 22, 1955

INVENTOR.
WILLIAM D. TIMMONS
BY
*Linton and Linton*
ATTORNEYS

United States Patent Office 2,763,143
Patented Sept. 18, 1956

2,763,143

DUST PAN OR CRUMB TRAY

William Dever Timmons, Coshocton, Ohio

Application April 22, 1955, Serial No. 503,305

2 Claims. (Cl. 65—20)

The present invention relates to shallow portable receptacles used for collecting dust, crumbs and like waste material swept from a flat surface and is particularly concerned with such receptacles generally referred to as dust pans and crumb trays.

The principal object of the present invention is to provide shallow portable receptacles particularly suitable for receiving relatively small pieces of material such as dust, crumbs and like undesirable material from flat surfaces, such as floors and table tops which receptacles are economically produceable and have the supporting handles therefor arranged on the bottom of the receptacle for ease and convenience in handling the same.

A further object of the invention is to provide shallow open end receptacles with the handles therefor mounted on the bottoms of the receptacles with at least one point of connection thereto being near the center of gravity of said receptacle and the body of the receptacle capable of being produced from one piece of material which is either opaque or transparent.

A still further and equally important object of the invention is to provide a shallow receptacle such as a dust pan or crumb tray which is of less length than such receptacles as herebefore known whereby the present receptacle can be more conveniently stored and further which receptacle can be manually moved through a handle mounted above and centered relative to the bottom of the receptacle for minimizing the effort required to lift and manipulate the receptacle.

Figure 1:
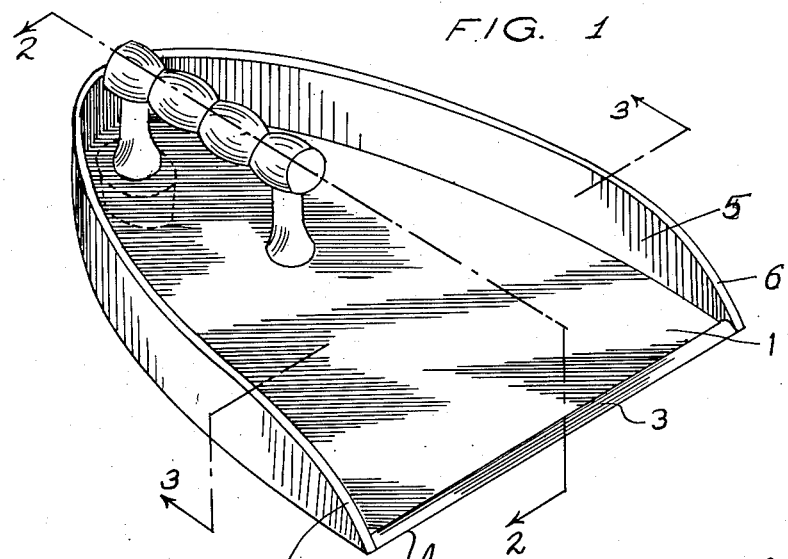

Further objects of the invention will be in part obvious and in part pointed out in the following description of the accompanying drawings, in which, Fig. 1 is a perspective view of the present receptacle.

Figure 2:
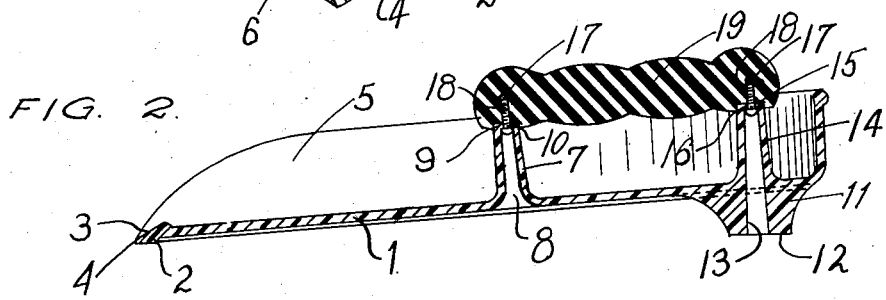

Fig. 2 is a longitudinal sectional view of the receptacle taken on line 2—2 of Fig. 1.

Figure 3:
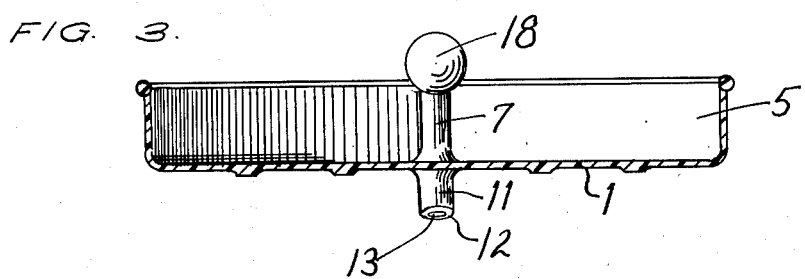

And Fig. 3 is a cross sectional view taken on line 3—3 of Fig. 1.

Referring now more particularly to the accompanying drawings wherein like and corresponding parts are designated by similar reference characters, numeral 1 refers to a substantially flat bottom for a shallow open end receptacle such as dust pans and crumb trays. Said bottom has a forward edge forming a substantially straight lip 2 whose upper surface 3 extends on a downward slant providing a relatively sharp leading edge 4. The remainder of said edge is of a catenarian or elliptical configuration.

A low wall 5 extends substantially perpendicular from said bottom and extends continuously from the opposite ends of lip 2 providing an opening therebetween at said lip with said wall ends 6 tapering downwardly to meet the leading edge 4.

Bottom 1 has a tubular upright or projection 7 extending substantially perpendicular therefrom, which projection has a bore 8 opening through said bottom while an annular shoulder 9 extends laterally across the top of said projection having a central opening 10. This projection 7 is located near the center of gravity of the receptacle being positioned substantially on the longitudinal axis of said bottom in a central position thereof.

A leg 11 is formed with said bottom extending downwardly therefrom and is likewise positioned on the longitudinal axis of said bottom on an opposite portion thereof from said lip 2. Said leg 11 has a substantially flat bottom 12 which is positioned with said bottom 12 being in the same plane with the lower surface of lip 2. Said leg has a central bore 13 which extends upwardly into a second protuberance 14 formed with bottom 1 and extending substantially perpendicular therefrom and on the longitudinal axis of said bottom. An annular shoulder 15 extends across said bore 13 at the top of projection 14 and has an opening 16 centrally located therethrough. A pair of screws 17 each extend through one of said openings 10 and 16 into threaded openings 18 in the lower face of a handle 19 whereby said screws are in threaded engagement with said openings retaining said handle on said projections. Accordingly, said handle 19 extends along the longitudinal axis of said bottom.

Bottom 1, wall 5, projections 7 and 14 and leg 11 are formed as one piece of material and for this purpose may be from opaque material, such as rubber, rubber containing materials, fiber containing materials, metals or plastics or may also be formed from shock resistent glass or transparent or translucent plastics. Handle 19 may be formed of similar materials, while a soft rubber handle is indicated on the drawing only by way of an example. The use of transparent materials for this purpose permits dust or litter to be seen through the bottom 1 so that said litter is not hidden by the receptacle and overlooked during the cleaning operation.

In use the present receptacle can be manually lifted and moved by wrapping the user's hand around handle 19 and very little strain is thus placed upon the user's wrist as the projection 7 is adjacent the center of gravity of the receptacle thereby balancing the receptacle when so grasped. This eliminates the weight being placed upon one end of the handle as in known types of receptacles which handles extend exteriorly of the receptacle thereby placing the entire weight on one end of the handle, creating a strain upon the user's wrist. In addition, the positioning of the present handle greatly shortens the overall length of the present receptacle as compared with known dust pans and crumb trays.

The present receptacle can be positioned upon any substantially flat surface by placing lip 2 and bottom 12 of leg 11 on said surface whereby said bottom 1 will extend on an angle relative to said flat surface due to the length of leg 11 and litter, crumbs, dust and other waste material can then readily be swept on to bottom 1 between wall 5 and the sharp leading edge 4 assists in the sweeping operation rendering an easy sweeping of the material onto the upper surface of bottom 1.

When the receptacle is not being used, it can be hung on a vertical surface having a nail, screw or like support extending therefrom as such a support can be inserted in bore 13. However, due to the comparatively short overall length of the receptacle it can be stored in drawers or other small areas.

The present receptacle is capable of considerable modification and such changes thereto as come within the scope of the appended claims are deemed to be a part of the present invention.

What I claim is:

1. A shallow receptacle for collecting waste material comprising a substantially flat bottom having a substantially straight lip provided at one edge thereof, a wall extending substantially perpendicular from said bottom with an opening having said lip extending thereacross, a plurality of tubular projections formed with and extending substantially perpendicular from and above said bottom and extending in a line substantially perpendicular to said lip with at least one projection positioned adjacent the center of gravity of said receptacle, a handle mounted on said projections and a tubular leg extending below and from said bottom on a portion opposite to said lip.

2. A shallow receptacle for collecting waste material comprising a bottom, a wall extending upwardly from said bottom around a portion of the edge of said bottom, said bottom having the remainder of the edge thereof forming a straight lip, a plurality of projections extending from and above said bottom and along the longitudinal axis thereof, a tubular leg extending downwardly from said bottom from a portion thereof opposite to said lip, said bottom, walls, projections and leg all being formed together as one piece of material and a handle connected to said projections and extending along and above the longitudinal axis of said bottom.

References Cited in the file of this patent

UNITED STATES PATENTS

| | | |
|---|---|---|
| 292,247 | Millett | Jan. 22, 1884 |
| 351,423 | Brown | Oct. 26, 1886 |
| 606,809 | Oursler | July 5, 1898 |
| 608,635 | Bartholomew | Aug. 9, 1898 |
| 675,256 | Weilenman | May 28, 1901 |
| 1,055,265 | Gibson | Mar. 4, 1913 |
| 1,287,181 | Barker | Dec. 10, 1918 |

FOREIGN PATENTS

| | | |
|---|---|---|
| 6,925 | Great Britain | Mar. 22, 1904 |
| 369,201 | France | Jan. 5, 1907 |